(12) United States Patent
Bessette (10) Patent No.: US 7,433,612 B2
(45) Date of Patent: Oct. 7, 2008

(54) TIMING WHEEL FOR TONER CARTRIDGE WITH DUAL SPRINGS

(75) Inventor: Lionel C. Bessette, North Grafton, MA (US)

(73) Assignee: Clarity Imaging Technologies, Inc., Springfield, MA (US)

( * ) Notice: Subject to any disclaimer, the term of this patent is extended or adjusted under 35 U.S.C. 154(b) by 335 days.

(21) Appl. No.: 11/246,926

(22) Filed: Oct. 7, 2005

(65) Prior Publication Data

US 2007/0092301 A1    Apr. 26, 2007

(51) Int. Cl.
*G03G 15/08* (2006.01)
(52) U.S. Cl. .......................................... 399/27; 399/263
(58) Field of Classification Search .................. 399/27, 399/254, 256, 262, 263; 222/DIG. 1; 118/694
See application file for complete search history.

(56) References Cited

U.S. PATENT DOCUMENTS

| 4,065,031 | A | | 12/1977 | Wiggins et al. | |
|---|---|---|---|---|---|
| 4,668,074 | A | * | 5/1987 | Hirozane | 399/27 |
| 5,634,169 | A | | 5/1997 | Barry et al. | |
| 5,942,067 | A | | 8/1999 | Newman | |
| 5,995,772 | A | | 11/1999 | Barry et al. | |
| 6,009,285 | A | | 12/1999 | Barry et al. | |
| 6,169,860 | B1 | | 1/2001 | Curry et al. | |
| 6,295,422 | B1 | | 9/2001 | Curry et al. | |
| 6,510,303 | B2 | | 1/2003 | Bessette | |
| 6,603,933 | B1 | | 8/2003 | Foegelle | |
| 6,718,147 | B1 | * | 4/2004 | Carter et al. | 399/27 |
| 7,218,871 | B2 | * | 5/2007 | Ogata | 399/27 |
| 2006/0188273 | A1 | * | 8/2006 | Takesawa et al. | 399/27 |

FOREIGN PATENT DOCUMENTS

| JP | 03017679 A | * | 1/1991 |
|---|---|---|---|
| JP | 04323678 A | * | 11/1992 |
| JP | 11084850 | | 3/1999 |

OTHER PUBLICATIONS

WIPO, "PCT International Search Report" citing the references herein.

* cited by examiner

*Primary Examiner*—Robert Beatty
(74) *Attorney, Agent, or Firm*—William A. Loginov; Loginov & Associates PLLC (57) ABSTRACT

This invention provides a timing wheel assembly for controlling the timing of toner cartridge operation that is fixedly attached to a shaft of a toner tank agitator and that is operatively connected to a drive gear of a toner cartridge mounted coaxially on the shaft with the timing wheel movable between a first stop and a second stop relative to the drive gear to define rotational "dwell" range having a predetermined arcuate distance with a pair of springs of differing strengths. The first spring, of a first strength (first spring constant) biases the timing wheel against the first stop and the second spring of a second strength (second spring constant) is engaged by the timing wheel at higher resistance levels. In this manner, the first spring ensures that an appropriate dwell and snapback motion occurs at lower toner levels and the second spring (in combination with the first) provides heavier resistance and stronger rotational resistance/earlier snapback at higher toner levels.

11 Claims, 5 Drawing Sheets

TIMING WHEEL FOR TONER CARTRIDGE WITH DUAL SPRINGS

BACKGROUND OF THE INVENTION

1. Field of the Invention

This invention relates to toner cartridges used in electronic or laser printers and more particularly to the sensors and timing mechanisms on the cartridge for controlling printer operation and status.

2. Background Information

Electronic or "laser" printers use a focused light beam to expose discrete portions of an image transfer drum so that these portions attract printing toner. Toner is a mixture of pigment (typically carbon black or a non-black color component) and plastic. The toner becomes electrostatically attracted to exposed portions of the image transferred drum. As a transfer medium such as paper is passed over the rotating image transferred drum, some of the toner is laid onto the medium. Subsequently, the medium passes through a heated fuser so that the plastic is melted into permanent engagement with the underlying medium.

The vast majority of desktop laser printers currently available utilize replaceable toner cartridges that incorporate an image transfer drum, a toner tank and a metering system and a drive mechanism for the drum and metering system. Modern toner cartridges often include a variety of sensors that interact with the laser printer in order to indicate the status of the cartridge. Indications relating to toner level, print quality and general cartridge function are often included. A large number of types and sizes of toner cartridges are currently available. Each cartridge is provided with its own set of operating parameters and toner fill limitations. Certain cartridges, such as those used in the E320/E322™ series printer, available from Lexmark® utilize a complex sensing system for determining cartridge performance. It should be noted that the principles discussed herein apply generally to any toner cartridge that employs a spring-loaded decoder or timing mechanism to track toner level and associated functions.

The cartridge's sensing system includes an encoder or timing wheel interconnected with one end of a rotating agitator blade within a cylindrical toner tank. Movement of the agitator blade feeds toner into the metering system. The timing wheel reports the movement of the agitator wheel through the toner reservoir. The resulting signal must fall within certain perimeters, or a variety of error conditions are indicated by the printer, and print engine operation may suddenly cease.

The timing wheel includes a set of perimeter notches at predetermined arcuate positions. The notches interact with an optical or electromechanical sensor on the print engine. The timing wheel is fixed to the agitator blade via a common shaft. Coaxially mounted on the shaft is a main drive gear that is operatively connected with the print engine drive train. The timing wheel and agitator blade shaft together provide "lost motion" or dwell (or "float") with respect to the drive gear within a predetermined arcuate limit. This limit is set by two opposing stops formed on an arcuate slot of the timing wheel. This arcuate slot rides on a stop post that extends from the drive gear. In general the motor rotates the drive gear through a full rotation to bring the agitator from a position above the toner, through the toner, and back out again. However, the float or dwell of the drive gear relative to the timing wheel causes a degree of play in the characteristic rotation between the drive gear and the timing wheel/agitator assembly.

To control the level of lost motion/dwell, the timing wheel is operatively connected to a spring that engages a post on the drive gear. When the drive gear is rotated by the motor, the timing wheel (and hence, the shaft of the agitator blade) is normally biased against the first of the two stops through back pressure exerted by the spring against the timing wheel. Any resistance on the agitator blade—caused generally by contact with toner—induces resistance to rotation and causes the timing wheel to begin to lag the rotation of the drive gear (with the spring being loaded and beginning to elastically deform, thereby causing the timing wheel's first stop to rotate away from the drive gear's stop post). If the resistance is strong enough, the timing wheel will strike the drive gear's stop post with its second, opposing stop (having rotated through the full arcuate dwell range), the spring being fully loaded at this point.

Naturally, if the spring is loaded by resistance as the agitator blade drags through the toner, eventually the agitator blade reaches a point near top of the toner supply and the resistance is overcome—often abruptly. At this point, the timing wheel's spring tends to rotationally snap the agitator arm upwardly out of the remaining toner supply, thereby relieving some of the spring force and bringing the timing wheel against the first drive gear stop again. The drive gear moves through each 360-degree cycle at a substantially constant rate of rotation. However, it should be clear that the dwell causes the timing wheel to display a variable rotational rate throughout its own associated 360-degree cycle. The variation in this rate causes the notches in the perimeter to be presented to the sensor at certain times that are compared to the constant timing of the motor. By determining whether these notches appear at the appropriate time in the cycle, the print engine can determine several parameters. For example, little movement of the first stop by the timing wheel indicates little resistance, and hence a low-toner supply. Likewise, little snapback confirms low toner. Conversely, a large rotational movement occurring early in the in the cycle, followed by a late and significant snapback may indicate an overfilled cartridge. Both these conditions cause the print engine's logic to signal an appropriate problem and (possibly) disable further print operations.

The strict limits placed upon this cartridge, and others, can prove difficult to overcome for manufacturers seeking to provide a higher-capacity toner tank for compatible cartridges. This is because manufactured and remanufactured cartridges must include no more than the original manufacture (OEM) toner level even if a higher level can be provided with appropriate performance. A higher level causes the agitator blade to move differently through the reservoir, thereby sending the above-described error/problem signal to the printer.

Commonly owned U.S. Pat. No. 6,510,303 B2, entitled EXTENDED-LIFE TONER CARTRIDGE FOR A LASER PRINTER, by Lionel C. Bessette, the teachings of which are expressly incorporated herein by reference, addresses certain problems encountered in providing a higher initial toner charge to a cartridge with strict sensing limitations on volume. A main improvement is the repositioning of timing slots on the timing wheel so that they trigger appropriate status signals for overfilled operation. Another improvement described in that patent entails the use of a spacer on a stop post that limits the range of dwell of the drive gear with respect to the agitator by reducing the spacing of the post from the first stop and the second stop. This modifies the snapback properties of the agitator and so that the timing of snapback is appropriate for higher-than-specified toner levels.

Likewise, to effect proper timing in an "overfilled" condition, the spring that provides resistance between the drive gear and agitator may be replaced with one having a higher spring force than the OEM-version spring. This would effectively allow snapback to occur earlier (at a time specified for an OEM-toner level) as the agitator can now drag itself through, and out of, the thicker (overfilled) layer of toner. However, a stronger replacement spring may provide little or no resistance-based dwell off of the first stop at a low (but not empty) toner condition. This may trigger the print engine to enter a "low-toner" condition prematurely, wasting toner and defeating the purpose of an extended-life cartridge. A more-comprehensive and elegant system for dealing with the great variation between overfilled conditions and minimal toner conditions is needed to apply to a broader range of cartridges.

SUMMARY OF THE INVENTION

This invention overcomes the disadvantages of the prior art by providing a timing wheel assembly for controlling the timing of toner cartridge operation that is fixedly attached to a shaft of a toner tank agitator and that is operatively connected to a drive gear of a toner cartridge mounted coaxially on the shaft with the timing wheel movable between a first stop and a second stop relative to the drive gear to define rotational "dwell" range having a predetermined arcuate distance with a pair of springs of differing strengths. Each spring provides predetermined rotational resistance between the drive gear and the timing wheel. The first spring, of a first strength (first spring constant) biases the timing wheel against the first stop and the second spring of a second strength (second spring constant) is engaged by the timing wheel at higher resistance levels. In this manner, the first spring ensures that an appropriate lag/dwell and snapback motion occurs at lower toner levels and the second spring (in combination with the first) provides heavier resistance and stronger rotational resistance/earlier snapback at higher toner levels.

More particularly, the invention provides a first spring having a first spring constant operatively connected to each of the main drive gear and the timing wheel, a second spring having a second spring constant operatively connected to each of the main drive gear and the timing wheel. Each of the first spring and the second spring are constructed and arranged so that the first spring applies a rotational resistance force between the main drive gear and the timing wheel at a first level of rotational resistance applied by the agitator assembly as the agitator assembly passes through toner and the second spring applies a second level of rotational resistance greater than the first level after the timing wheel has rotated past a predetermined arcuate position under rotational resistance from the first spring. The first spring constant and the second spring constant can be approximately the same or can differ. For example, the second spring constant can be greater than the first in an embodiment.

In one embodiment, the first spring is wrapped around the axis of the timing wheel and has a first end mounted to a post on the timing wheel and a second end mounted to a base on the gear so as to apply a bias to the timing wheel/agitator assembly, biasing a stop in an arcuate slot timing wheel against a stop post on the drive gear. The second spring is also mounted on the timing wheel post at a first end and wrapped relatively loosely around the axis. A second free end extends outwardly from the axis and is positioned to engage the stop post or another gear-mounted structure at or beyond the predetermined arcuate position to lend a second level of resistance force to the overall system. In certain embodiments, the free end can be restrained in one direction by a hook or other stop that imparts mild preloading into the second spring.

In various embodiments, the slots or other indicia on the timing wheel that generate appropriate timing signals are rotationally offset to provide signals at times appropriate for an overfilled condition—in which dwell occurs earlier in the rotation cycle due to the agitator engaging the (higher) toner supply earlier in the cycle.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
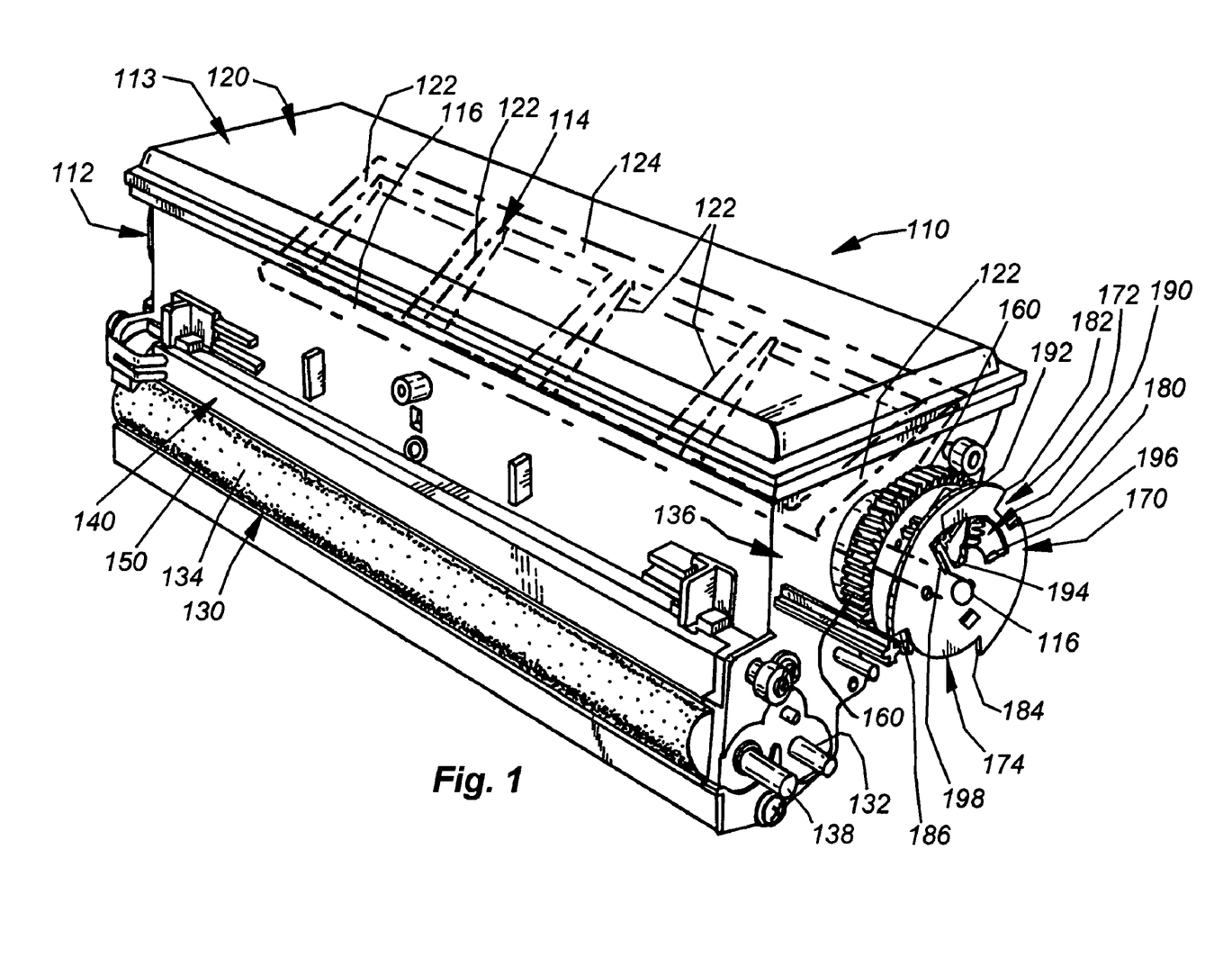
FIG. 1 is a partially exposed perspective view of an exemplary toner cartridge having a timing wheel with dual springs according to an embodiment of this invention.

FIG. 1 details an exemplary toner cartridge 110 that has been adapted for a toner supply that exceeds the OEM-specified maximum according to an illustrative embodiment of this invention. The exemplary cartridge 110 is employed in the E320/E322™ series printer, available from Lexmark®. However, the principles described herein are meant to apply to a variety of toner cartridges that utilize a sensing system for controlling and monitoring printer and cartridge performance. In the illustrated exemplary cartridge the timing wheel (170) is attached to the drive gear and the above-described dwell between the drive gear and timing wheel all occur on the depicted side of the cartridge. In other cartridges, such as that shown and described in the above-incorporated U.S. Pat. No. 6,510,303B2, entitled EXTENDED-LIFE TONER CARTRIDGE FOR A LASER PRINTER an encoder or timing wheel may be mounted on a side of the cartridge (attached to the agitator shaft) opposite from a side containing the spring-loaded drive gear and dwell-inducing mechanism. Regardless of timing wheel placement, it is contemplated that the system and method taught herein may apply in whole or part to any toner cartridge that employs dwell/lost motion to derive data about toner supply level and/or condition. As noted above, the general operation of the encoder/timing wheel and exemplary modifications that can be made thereto in order to enable a larger-than-specified toner capacity are taught in the above-incorporated U.S. Pat. No. 6,510,303B2, entitled EXTENDED-LIFE TONER CARTRIDGE FOR A LASER PRINTER.

Briefly, the housing 113 defines a toner tank section 120 in which the agitator 114 rotates. The toner tank is a reservoir that holds a predetermined amount of black or colored toner. Typically, such toner is a so-called "one-part" toner in which color and the fusible/electrostatically attracted plastic are a single particle. The agitator 114 has ribs 122 and an end bar 124 that extend from the shaft 116. They pass through the toner supply in the tank and cause it to be directed downwardly into the developer section 130 which consists of an internal adder roller (see shaft 132) and an elastomerically covered developer roller 134. The developer roller picks up toner from the adder roller via electrostatic attraction and this toner is metered by the metering or "doctor" blade 140. While not shown, the cartridge includes a photoconductive image transfer drum that becomes selectively electrically charged as it rotates by exposure from the light of a laser element or similar assembly. The exposed spots created by the laser attract toner from the developer roller and cause it to migrate onto the drum. Thereafter the image drum deposits the toner onto a printable substrate (paper, typically) and this toner is permanently bonded to the substrate via fusion or melting of the toner particles in a fuser section (not shown) that is part of the print engine in most arrangements. A semi-rigid (Mylar) seal 150 prevents toner in the sump from dropping out of the feed section of the cartridge. In general, the metering operation attempts to minimize the amount of waste toner where possible.

The developer roller 134 has a shaft end 138 (projecting from the tank side wall 136 that normally carries a gear, which is omitted for clarity. Likewise, the adder roller's end shaft 132 carries such a gear, also omitted for clarity. These gears interact with a main gear on the print engine's drive motor (not shown). The motor also drives a main drive gear 160 that is mounted coaxially on (but not rotationally fixed to) the agitator shaft 116. Also mounted on this shaft is the timing wheel 170 according to an embodiment of this invention. All components rotate in synchronization with respect to the drive motor so that appropriate rotational timing between components is maintained. This timing is relied upon by the sensing system of the print engine, which can include encoders operatively connected to the print motor (that provide a master timing signal), an encoder wheel on the cartridge with associated electromechanical and/or optical pickups on the engine and the timing wheel, with associated electromechanical and/or optical pickups. These pickups look for the presence of notches 172 and 174, each having a predetermined arc length, with opposing ends (180 and 182; 184 and 186, respectively) placed at predetermined positions that are registered to the rotational position of the agitator 114. These notches must reside within the pickup at predetermined times relative to the cyclic motion of the drive motor (detected via its internal encoder or another movement sensor) or the print engine will indicate an error or other problematic condition (such as low toner).

Figure 2:
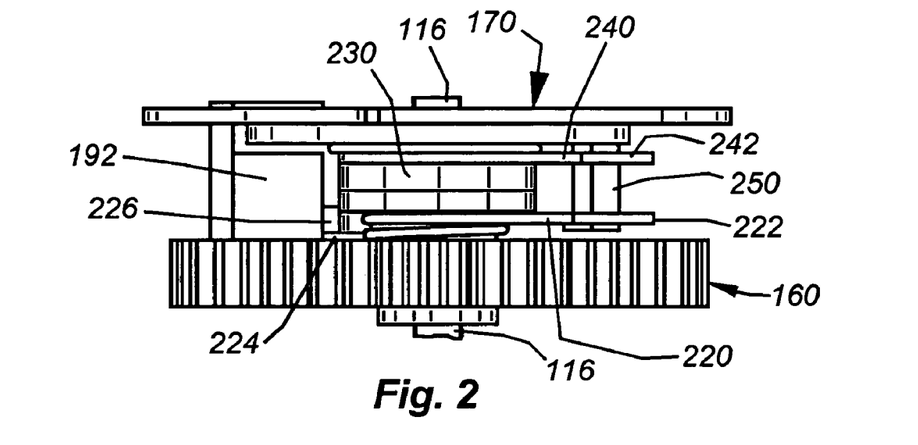
FIG. 2 is a side view of the timing wheel and drive gear of FIG. 1.
Figure 2A:
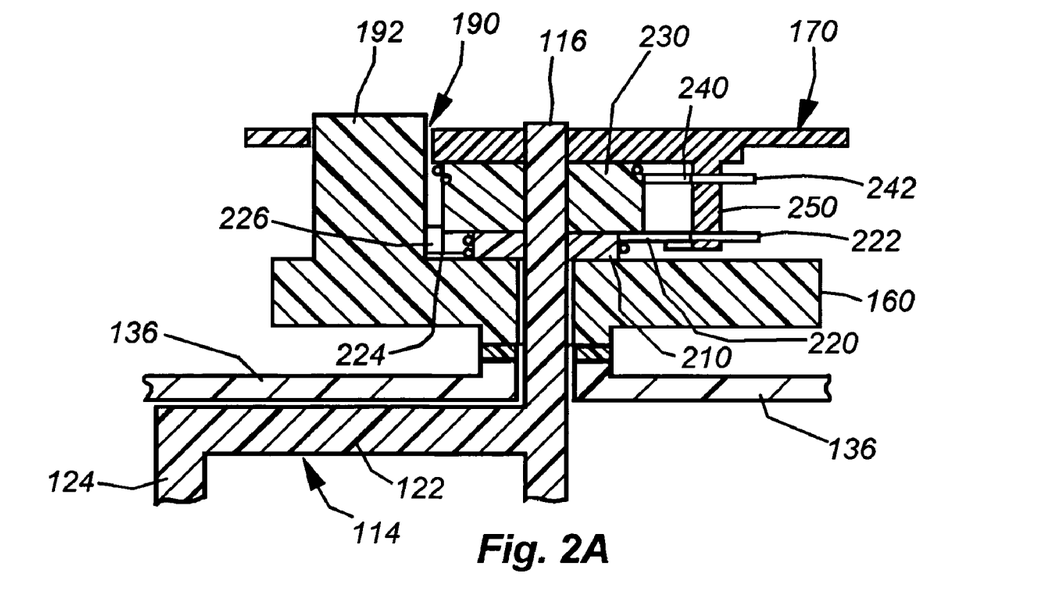
FIG. 2A is a fragmentary side cross section of the timing wheel and drive gear of FIG. 1 mounted in the agitator blade shaft extending through the wall of the cartridge toner tank.
Figure 3:
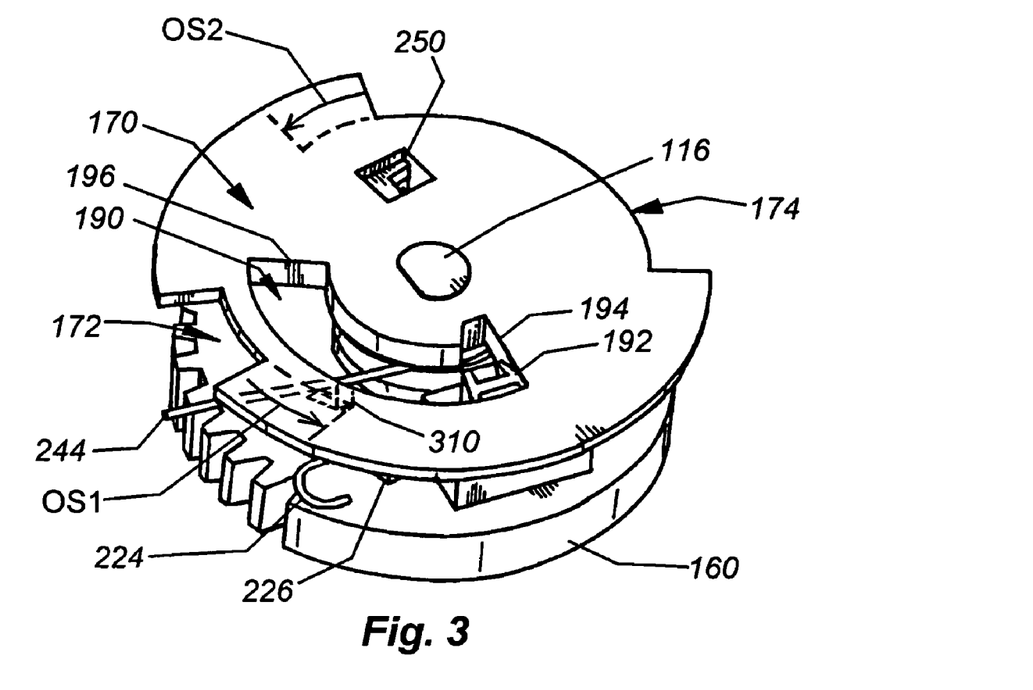
FIG. 3 is a top perspective view of the timing wheel and drive gear of FIG. 1.

With reference now to FIGS. 2 and 2A, the timing wheel 170 and main drive gear 160 are shown in further detail. In particular, the timing wheel 170 is mounted fixedly on a keyed end of the shaft 116 so that it is fixed in rotation with respect to the shaft 116 and integral agitator assembly 124. The timing wheel 170 includes an inboard (toward the direction of the tank wall 136) base 210 that reinforces the attachment of the timing wheel to the shaft 116 and also provides a first-diameter cylinder 210 around which are wrapped a first spring 220. A larger, second-diameter cylinder 230 provides a base around which is wrapped a second spring 240. Because the second diameter is larger than the first in this exemplary embodiment, it provides positive axial separation between the springs. In other words the wrapping of first spring 220 cannot climb into contact with the second spring (240) wrapping. The springs 220 and 240 are anchored at one end 222 and 242, respectively (by end-loops, for example), to a post 250 that projects inwardly from the timing wheel 170 toward the main drive gear 160. The first (weaker) spring is anchored at its opposite end 224 to a binding hook or post 226 formed on the surface of the main drive gear 160. Thus, the first spring is wrapped with a predetermined tension and fixed at each of opposing ends 222, 224 to each of the timing wheel 170 and main drive gear, thereby inducing a predetermined rotational bias between the wheel and gear. This bias forces the timing wheel to rotate until the first stop 194 (see FIG. 3) of an arcuate slot 190 (see also FIGS. 1 and 3) contacts a stop post 192 on the main drive gear. Note that the arcuate slot 190 sets the rotational limits of the timing wheel 170 relative to the main drive gear 160. This is the relative (non-toner-resisted) position of the timing wheel and main drive gear absent any resistance applied to the agitator assembly.

Notably, the second spring 240 is not bound on its opposing (free) end 244, but resides in the non-toner-resisted position generally unrestrained and unengaged by any stop or post in at least one rotational direction. The second spring may be preloaded by restraining the free end 244 using an optional hook 310 attached to the underside of the timing wheel 170 (as shown in phantom in FIG. 3). Using this hook 310, the free end may be offset and wound approximately 5-15 degrees from a resting state. While it may be preloaded, in this embodiment the second (stronger) spring initially applies no additional and/or substantial rotational biasing force to the timing wheel relative to the main drive gear beyond that provided by the first spring 220. When it is contacted by the post 192, the second spring provides a second level of resistance that will be described further below. The optional preloading hook 310 ensures that the contact point is always at the same location (e.g. where the free end 244 engages the hook) and that a relatively constant initial resistance force (due to preloading) is applied between the post 190 on the drive gear 160 and the timing wheel 170. When the post 192 engages the free end 244, it causes the spring to wind, taking the free end out of the open side of the hook 310. When tension on the spring free end 244 is released (after snapback), the free end 244 rides back into engagement with the open side of the hook, ready for the next cycle.

Figure 4:
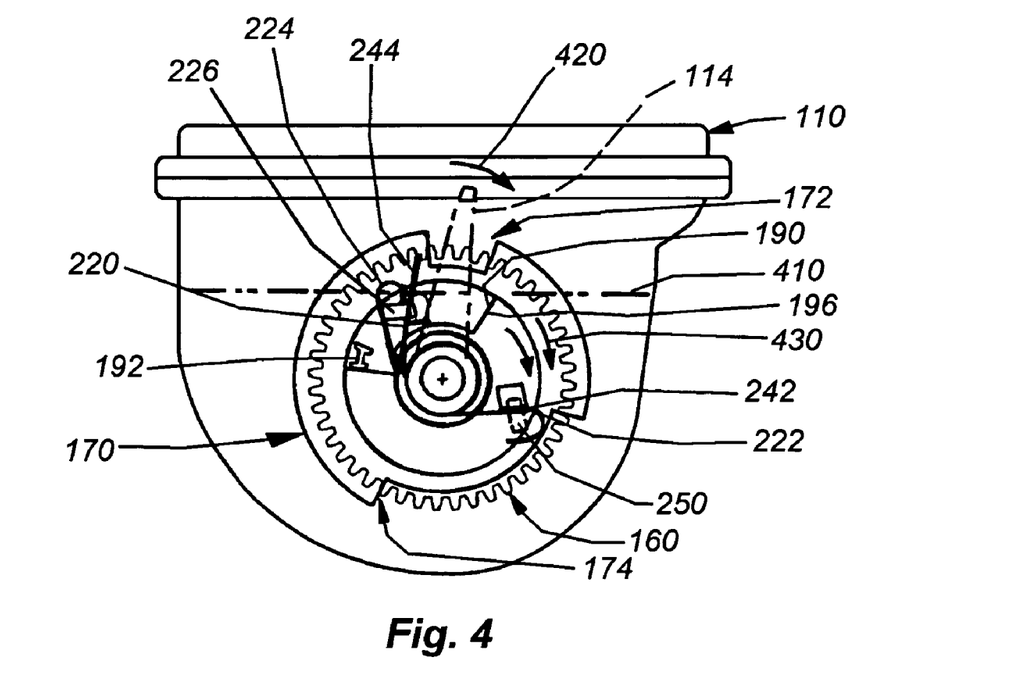
FIG. 4 is an exposed side view of the cartridge's toner tank, drive gear, timing wheel and interconnected agitator, showing the relative motion of these components through a filled toner supply in a first position wherein the agitator is positioned above the toner line.
Figure 5:
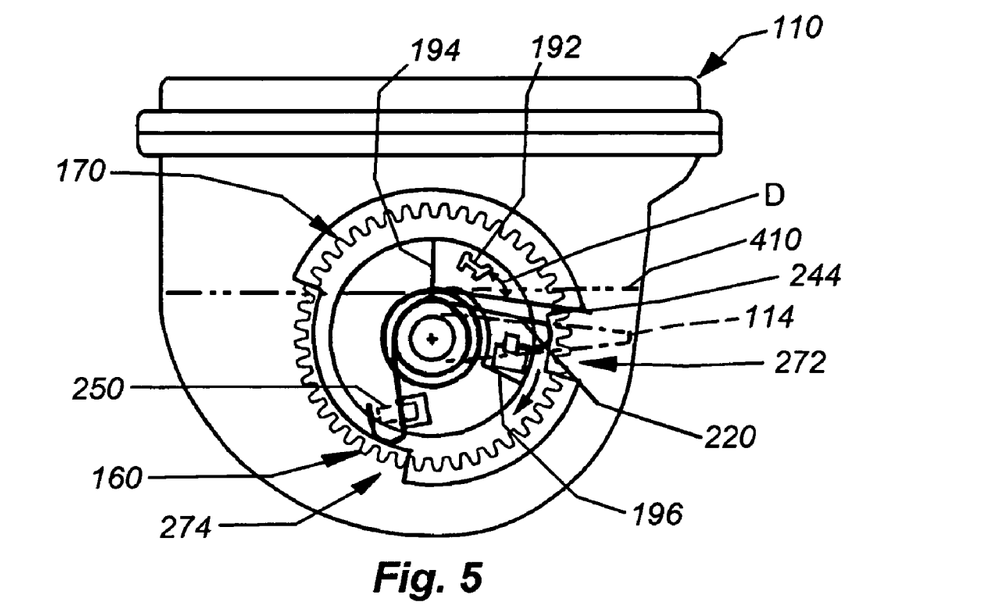
FIG. 5 is an exposed side view of the cartridge's toner tank, drive gear, timing wheel and interconnected agitator, showing the relative motion of these components through the filled toner supply in a second position wherein the agitator has passed through the toner line, and the rotation of the agitator and timing wheel are lagging the drive gear due to resistance by the toner.
Figure 6:
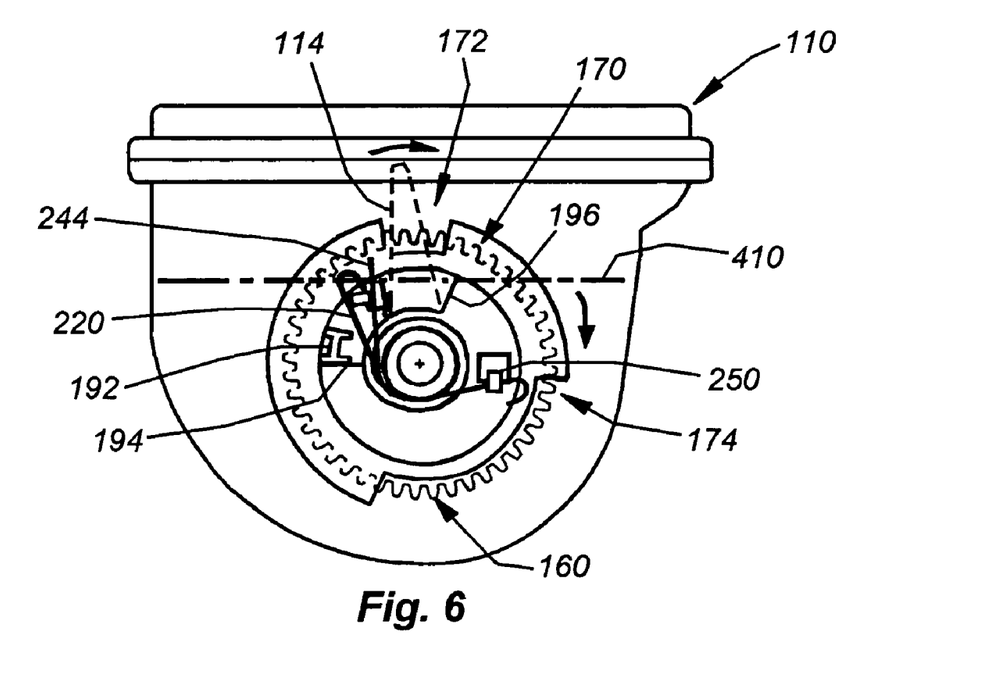
FIG. 6 is an exposed side view of the cartridge's toner tank, drive gear, timing wheel and interconnected agitator, showing the relative motion of these components through the filled toner supply in a third position wherein the agitator has snapped above the toner line.
Figure 7:
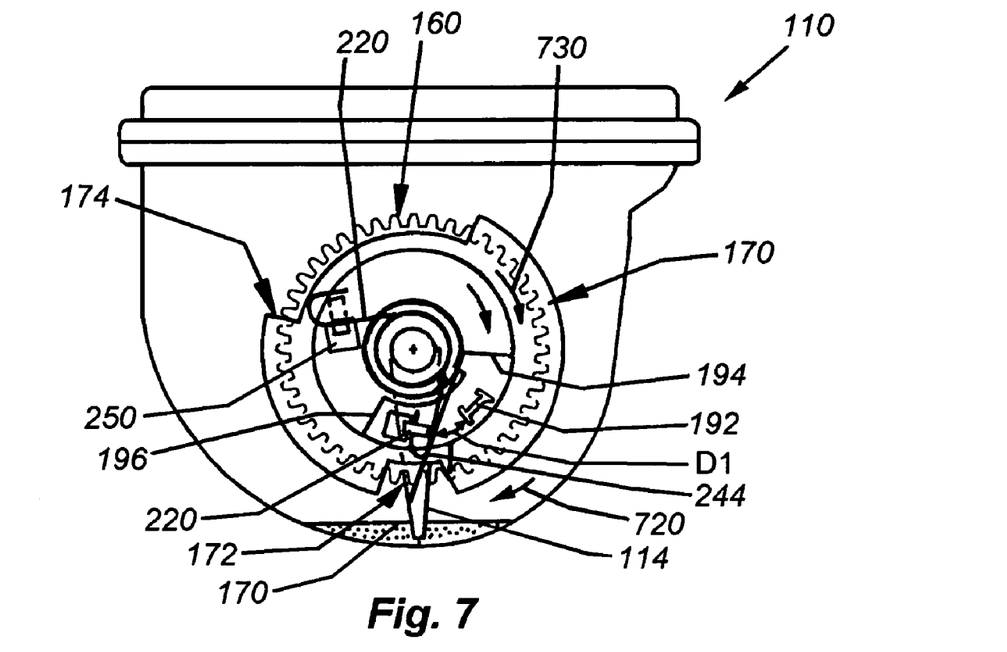
FIG. 7 is an exposed side view of the cartridge's toner tank, drive gear, timing wheel and interconnected agitator, showing the relative motion of these components through a very low toner supply in a first position wherein the agitator has passed through the toner line, and the rotation of the agitator and timing wheel are lagging the drive gear due to resistance by the toner.
Figure 8:
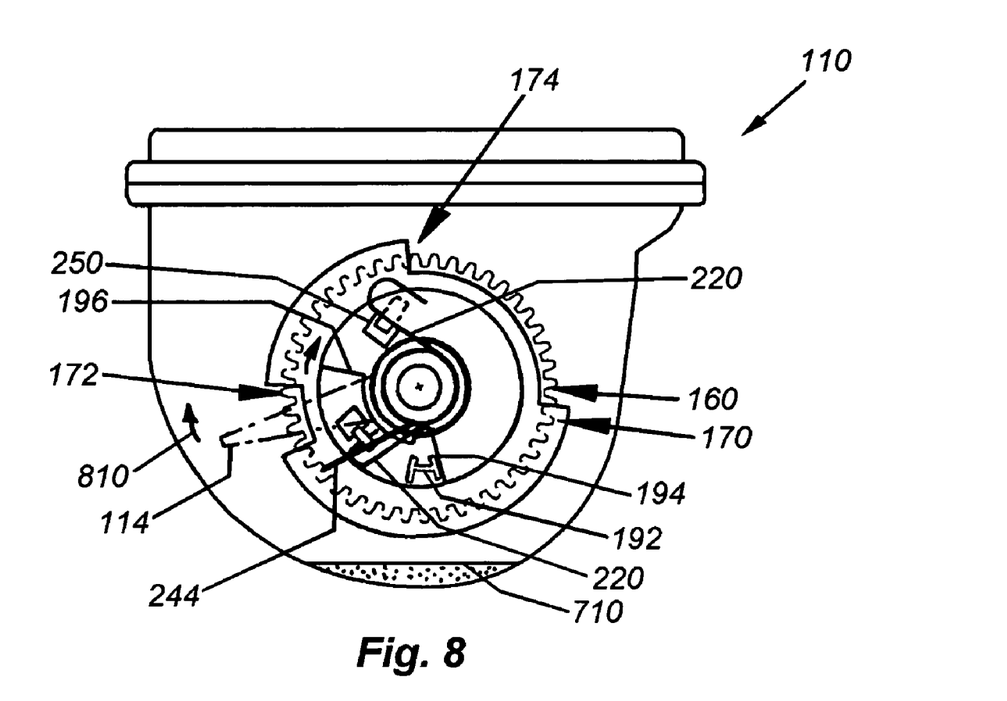
FIG. 8 is an exposed side view of the cartridge's toner tank, drive gear, timing wheel and interconnected agitator, showing the relative motion of these components through the very low toner supply in a third position wherein the agitator has snapped above the toner line.

Having described generally the structure of the timing wheel 170, main drive gear 160 and springs 220, 240, Reference is now made to FIGS. 4-6, which show the operation of these components in a high-toner level condition and FIGS. 7-8, which show the operation of the components in a low-toner-level condition. As shown in FIG. 4, the toner level is represented generally by the dashed level line (toner line) 410. Toner resides below this line as shown. The agitator assembly is shown at an approximate idle position, awaiting a print cycle. With each print cycle, the drive motor (nor shown) rotates the main drive gear 160 (arrow 430) to cause rotation of the agitator assembly 114 in the clockwise direction (arrow 420). In one rotational cycle the toner is initially engaged by the agitator 114 at the line 410, and then the agitator passes fully through the sump to eventually return back at the idle position shown in FIG. 4. In the idle position, prior to engagement, the stop 194 at one end of the arcuate slot 190 engages the post 192 under bias from the first spring 220.

Again stated, since the print engine measures toner level and other functions by reading the time-based (relative to the motor's cycle) positions of the timing grooves/slots 172 and 174, these slots must present themselves at certain times to the engine during the cycle. The rotational dwell of the timing wheel 170 (which is connected to the agitator assembly 114) allows a degree of arcuate variability (approximately 80-110 degrees) in the position of the slots 172, 174 with respect to the timing of the (360-degree) overall print cycle. The amount of variability (essentially the amount of lag or dwell in agitator/timing wheel rotation relative to motor/gear rotation) occurs in response to the amount of resistance placed by the toner supply on the agitator as it drags through the tank. The system looks for a predetermined pattern or limits of dwell to ensure that too little or too much toner is not present in the supply to allow desired operation. In the case of too much toner, it has been recognized that the cartridge can be modified to allow greater toner supply than OEM-specified, but this causes the resistance on the agitator to be increased and to occur earlier (due to a higher initial toner line) than expected by the print engine. This may be used to signal an overfill condition or other error. To address the earlier initial dwell in an overfilled toner supply, each slot 172 and 174 is respectively modified to include an additional offset (beyond OEM specification) OS1 and OS2 (shown in phantom in FIG. 3) on at least one slot edge. In this embodiment, each additional offset is approximately 15 degrees, but the exact amount of offset and its placement is highly variable depending upon the particular type of sensing system and desired level of overfill.

As noted, snapback is expected at a particular time in the overall cycle by the OEM-based sensing system. While simply increasing the spring tension may provide the appropriate generate the increased resistance needed for earlier snapback in an overfilled supply, a heavy spring also generates virtually no dwell or snapback where toner is quite low. When the OEM print engine senses little or no dwell/snapback it presumes that the cartridge out of toner, as a low cartridge sump level typically provides no resistance to the agitator. Hence, a stronger spring will drag through a low (but not exhausted) toner supply with little or no dwell/snapback—thereby causing the system to erroneously report an out-of-toner condition. This wastes toner at the tail end of cartridge life, despite the increase in supply at the front end of life.

Thus, the provision of two springs 220 and 240 effectively solves the problem by allowing an initial level of dwell and snapback at a lower spring force that is sufficient to satisfy a low toner condition, but that affords greater resistance at high fill levels, thus ensuring adequate snapback at such high fill levels. Again referring to FIG. 4, the main drive gear 160 drives the agitator (arrows 420 and 242) with the timing wheel 170 biased against the stop post 192 by the first spring 220.

In FIG. 5, the agitator has begun to contact the toner line 410. Note that the gear-mounted stop post 192 is moving away from the slot stop 194 as the resistance of the toner begins to bear upon the agitator and interconnected timing wheel 170 while the gear 160 is driven at its normal rate by the motor. Given the increased quantity of toner in the extended-life configuration of this embodiment (i.e. approximately an additional 20-50 percent supply of toner is provided compared with the OEM-specified level. The resistance on the first spring is somewhat greater than OEM-specified and occurs earlier in the cycle. The earlier dwell induced by the toner-overfill is addressed by the offset slot edges as described above. As dwell increases under resistance from only the first spring, the post 192 of the drive gear is moving toward the free end 244 of the second spring 240. This free end may or may not be restrained by a preloading hook (310 as described above. The second spring is located at a relative distance D and has a relative strength (spring constant) that ensures the timing wheel will maintain a desired dwell to indicate an adequate fill level. Notably, the second spring 240 biases against the post under maximum fill conditions and provides sufficient force to allow further deflection/dwell of the timing wheel relative to the gear with both springs bearing upon the agitator assembly.

As shown further in FIG. 5, the combination of bias provided by the first spring 220 and the second spring 240 have forced the agitator assembly 114 through the extended-life toner supply and have provided sufficient force to ensure snapback at the appropriate time. Note that the additional force causes snapback to occur earlier (e.g. deeper in the toner supply) than would occur if a weaker spring were used. Since snapback may be expected earlier by the print engine, given that OEM-specified toner levels are lower than the extended-life/overfill levels, the use of the stronger spring combination helps to ensure an earlier snapback, comporting with the expected timing. As shown in FIG. 6, following snapback the free end 244 of the second spring 240 is disengaged from the post 192 (ad may become engaged by the optional hook 310), and the first spring 220 returns the first slot stop 194 into engagement with the post 192.

As noted above, the use of a two-stage spring force is particularly effective in allowing the illustrative extended-life cartridge to operate over the full range of toner levels, including the lowest OEM-specified levels. As shown in FIG. 7, the toner line 710 is now located at just above a minimal level for normal, high-quality print operations to occur. The agitator assembly 114 has been driven (arrow 720) by the drive gear 160 (arrow 730) into engagement with the toner supply. At the "six-o'clock" position as shown, approximately maximum resistance is being applied to the agitator and the force of the first spring 220 is being overcome as the toner imparts resistance to the agitator and timing wheel 170 relative to the drive gear 160. Hence the gear stop post 192 is shown spaced from the first slot stop 194 with an induced dwell. This is the approximate maximum dwell that will be experienced at this toner level, but it is sufficient to ensure that the system functions within expected parameters, and a sufficient toner level is reported to the print engine. Note that a stronger first spring would lead to less or no dwell, and thus, might prematurely signal an out-of-toner condition. Notably, the free end 244 of the second spring 240 remains at a spacing D1 from the post (engaging the optional hook 310). The free end 244 will most likely not come into contact with the post 192 during this cycle given the low-level of resistance applied by the toner supply to the agitator. The second spring's main function in this context is to provide the extra resistance/snapback force needed at high levels without compromising the lighter levels of force needed at very low toner levels.

As shown in FIG. 8, the first spring effectively causes the expected snapback (arrow 810) at the low-toner level depicted. This snapback is within parameters for continued operation in this example. At this time, the gear stop post 192 is now shown resting against the first slot stop 194.

It should be noted that an illustrative embodiment that the first stop 194 may include a damper or other shock-absorber as shown by the exemplary leaf-spring 198 in FIG. 1. Such a shock-absorbing leaf spring 198 is conventional and formed unitarily with the timing wheel 170. It helps to prevent excessive shock and wear during snapback.

The strength, number of windings and associated spring constants of the first spring and the second spring are highly variable. In one embodiment, the first spring can have an applied force of approximately 4 grams, increasing variably to 20 grams. The second spring can have the same, a greater or lesser applied force (in a range of approximately 4 grams to 70 grams). The forces would increase to match the forces in the toner delivery system.

The foregoing has been a detailed description of an illustrative embodiment of this invention. It should be clear that various modifications and additions can be made without departing from the spirit and scope of this invention. For example, spring attachment points can be altered. One or both of the two springs can be mounted fixedly with respect to the gear and made to strike a post on the timing wheel. Likewise, while wrapped coil springs are employed, a variety of alternative spring-like structures can be employed in alternate embodiments to provide requisite rotational resistance at each of two levels. Similarly more than two springs can be employed in an alternate embodiment or a single spring with two discrete levels of resistance at different arcuate dwell/deflections can be employed. For the purposes of this description the terms "first spring" and "second spring" should therefore be taken broadly to collectively include unitary and integral structures that apply at least two levels of resistance at two respective arcuate rotational positions. Likewise, while the term "timing wheel" is used to generally describe a disk with cuts or detents that are read by an electro-optical or electromechanical sensor, the term timing wheel should be taken broadly to describe any type of structure that reports the point-in-time rotational position of the agitator assembly with respect to the main drive assembly to that the relative position of the (floating/dwelling) agitator assembly with respect to the main drive's (motor, etc.) position can be determined. The use of a plurality of levels of spring pressure to bias the agitator assembly with respect to the main drive is a notable feature of this invention, regardless of the particular technique by which the relative motion is sensed by the system. Accordingly, this description is meant to be taken only by way of example, and not to otherwise limit the scope of this invention.

What is claimed is:

1. A timing wheel assembly that controls timing of a toner cartridge comprising:
   a timing wheel base fixedly mounted on a shaft operatively connected to a toner tank agitator assembly that rotates on an axis;
   a main drive gear mounted on the axis that rotatably dwells within a predetermined arcuate range between a first stop and a second stop with respect to the timing wheel;
   a first spring having a first spring constant operatively connected to each of the main drive gear and the timing wheel;
   a second spring having a second spring constant greater than the first spring constant operatively connected to each of the main drive gear and the timing wheel; and
   wherein each of the first spring and the second spring are constructed and arranged so that the first spring applies a rotational resistance force between the main drive gear and the timing wheel at a first level of rotational resistance applied by the agitator assembly as the agitator assembly passes through toner and the second spring applies a second level of rotational resistance greater than the first level after the timing wheel rotates past a predetermined arcuate position under rotational resistance from the first spring.

2. The timing wheel assembly as set forth in claim 1 wherein the first spring is wrapped around the axis and includes a first end that is mounted to a post on the timing wheel and a second end that is mounted to a base on the main drive gear.

3. The timing wheel assembly as set forth in claim 2 wherein the second spring is wrapped around the axis and includes a first end that is mounted to the post and a second end that extends freely so as to selectively engage a structure on the main drive gear at and beyond the predetermined arcuate position.

4. The timing wheel assembly as set forth in claim 3 wherein the main drive gear includes a stop post that moves between two stops formed on opposing ends of an arcuate slot in the timing wheel and the second end of the second spring is constructed and arranged to engage the stop post at and beyond the predetermined arcuate position.

5. The timing wheel assembly as set forth in claim 4 wherein the timing wheel includes a hook that retains the second end of the second spring so as to preload the second spring before contact with the stop post.

6. A system that controls toner cartridge operation by sensing a relative rotational position of a drive component with respect to an agitator assembly that rotatably passes through a toner tank at a predetermined overall range of rotational deflection under spring bias based upon resistance imparted by a toner supply in the tank comprising:
   a spring assembly having a first spring operatively connected between the agitator assembly and the drive component imparting a first rotational resistance force to the agitator assembly with respect to the drive component while the agitator assembly is within a first range of rotational deflection of the overall range with respect to the drive component and a second spring operatively connected to each of the agitator assembly and the drive component that imparts a second, stronger rotational resistance force to the agitator assembly with respect to the drive component while the agitator assembly is within a second range of rotational deflection of the overall range, greater than the first range, with respect to the drive component.

7. The system as set forth in claim 6 wherein the first spring has a predetermined bias level between the agitator assembly and the drive component when the agitator assembly is free of resistance from the toner supply and the second spring having a first end operatively connected to one of the agitator assembly and the drive component and a second end that selectively engages, respectively, one of the drive component and the agitator assembly within the second range.

8. A method for controlling toner cartridge operation by sensing a relative rotational position of a drive component with respect to an agitator assembly that rotatably passes through a toner tank at a predetermined overall range of rotational deflection under spring bias based upon resistance imparted by a toner supply in the tank comprising:
   imparting a first rotational resistance force to the agitator assembly with respect to the drive component by a first spring operatively connected between the agitator assembly and the drive component while the agitator assembly is within a first range of rotational deflection of the overall range with respect to the drive component; and
   imparting a second, stronger rotational resistance force to the agitator assembly with respect to the drive component by a second spring operatively connected to each of the agitator assembly and the drive component while the agitator assembly is within a second range of rotational deflection of the overall range, greater than the first range, with respect to the drive component.

9. The method as set forth in claim 8 wherein the step of imparting the first rotational resistance force including biasing the first spring at a predetermined bias level when the agitator assembly is free of resistance from the toner supply.

10. The method as set forth in claim 8 further comprising providing a timing wheel operatively connected to the toner tank, fixedly mounted on a shaft that rotates on an axis.

11. The method as set forth in claim 10 further comprising retaining an end of the second spring within the timing wheel so as to preload the second spring before contact with the drive component.

\* \* \* \* \*